United States Patent [19]

Wetter et al.

[11] Patent Number: 5,134,733
[45] Date of Patent: Aug. 4, 1992

[54] CAR BED FOR INFANTS

[75] Inventors: Hermann Wetter, Ulm; Waldemar Czernakowski, Blaustein, both of Fed. Rep. of Germany

[73] Assignee: Britax Romer Kindersicherheit GmbH, Fed. Rep. of Germany

[21] Appl. No.: 763,824

[22] Filed: Sep. 23, 1991

[30] Foreign Application Priority Data

Nov. 15, 1990 [GB] United Kingdom ............... 9024897

[51] Int. Cl.⁵ ............................................. A47D 7/04
[52] U.S. Cl. ............................................. 5/94; 5/118; 297/216
[58] Field of Search ............... 5/94, 93.1, 101, 118; 297/216, 250

[56] References Cited

U.S. PATENT DOCUMENTS

| | | | |
|---|---|---|---|
| 3,579,673 | 5/1971 | Hirschey | 5/94 |
| 3,833,946 | 9/1974 | Von Wimmersperg | 5/94 |
| 3,833,947 | 9/1974 | Sorensen | 5/94 |
| 4,140,750 | 8/1978 | Kelter et al. | 5/93.1 |
| 4,231,612 | 11/1980 | Meeker | 297/250 |
| 4,345,791 | 8/1982 | Beyans et al. | 297/216 |
| 4,371,206 | 2/1983 | Johnson, Jr. | 5/101 |
| 4,500,133 | 2/1985 | Nakao et al. | 297/250 |
| 4,591,208 | 5/1986 | McDonald et al. | 297/216 |
| 4,998,307 | 3/1991 | Cone | 5/94 |

FOREIGN PATENT DOCUMENTS

| | | | |
|---|---|---|---|
| 0237759 | 2/1987 | European Pat. Off. | |
| 2303682 | 3/1975 | France | 5/94 |
| 2136685 | 9/1984 | United Kingdom | 297/250 |

Primary Examiner—Renee S. Luebke
Assistant Examiner—Michael Milano
Attorney, Agent, or Firm—Davis, Bujold & Streck

[57] ABSTRACT

A car bed for an infant comprises a cot body having a generally rigid rim providing support for rigid end portions, side portions and a bottom portion. A U-shaped handle has the ends of its limbs pivotally attached to the end portions of the cot body for angular movement about an axis extending longitudinally above the center of gravity of the cot body, between a position in which said limbs are perpendicular to said bottom portion and a position in which the handle is located to one side of said opening. In use, a seat belt is received in guide formations on the handle. Since the handle is located above the center of gravity of the car bed as a whole, the cot body will rotate as a unit deceleration, so that the bottom portion of the cost body is displaced forwardly in an arcuate path to a forwardly and upwardly inclined position.

14 Claims, 5 Drawing Sheets

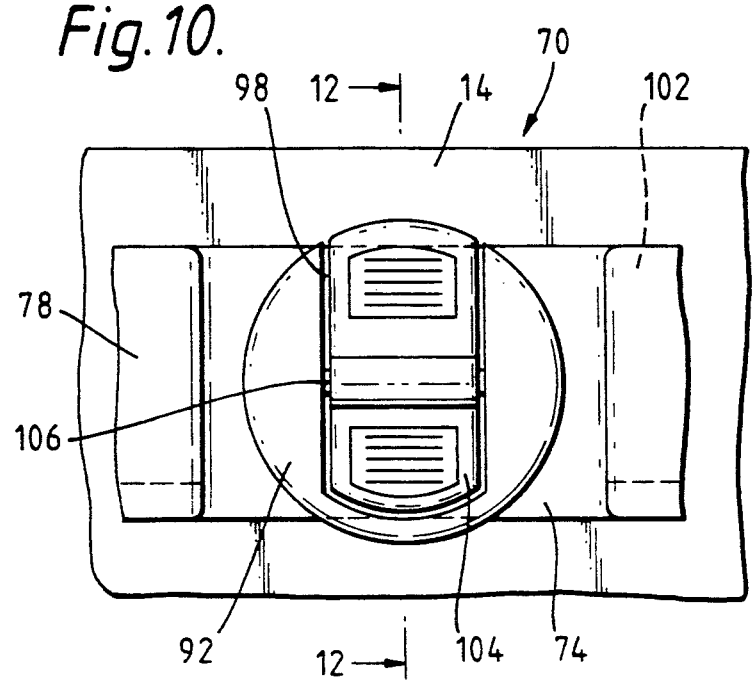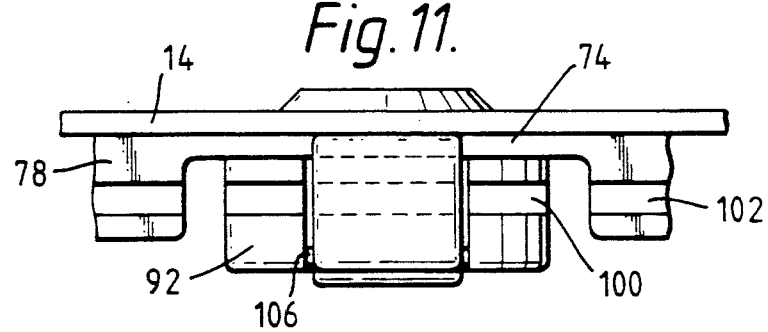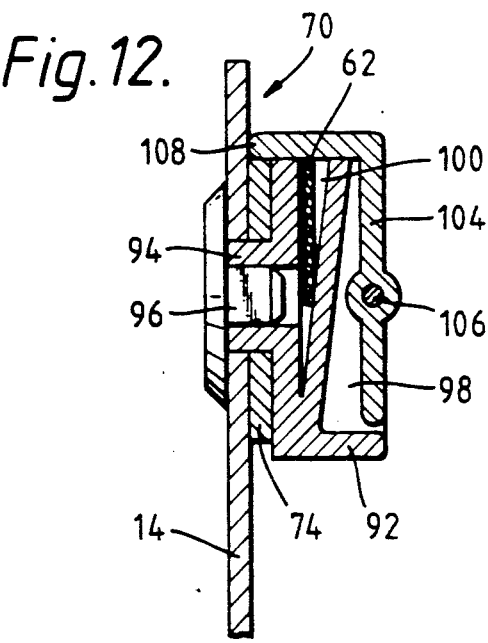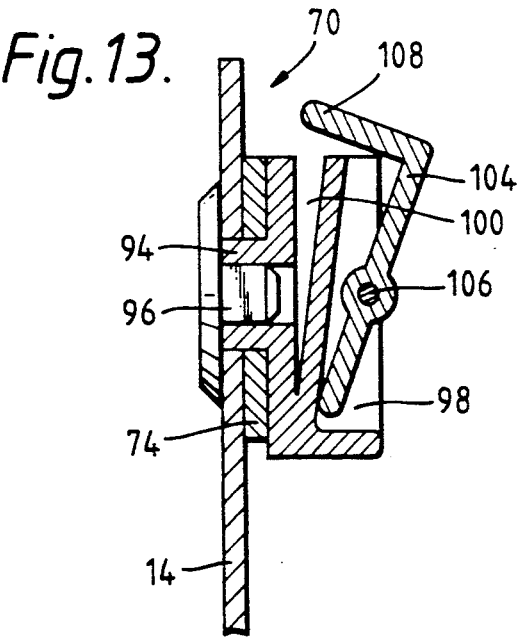

CAR BED FOR INFANTS

BACKGROUND OF THE INVENTION

This invention relates to a car bed for an infant of the type comprising a cot body having a generally rigid rim providing support for end, side and bottom portions of the cot body, at least the end portions being rigidly constructed and attached to the rim; belt guide means located on the body above the centre of gravity of the car bed as a whole so that, in use, the body will rotate as a unit upon sudden deceleration, so that the bottom portion of the body is displaced forwardly in an arcuate path to a forwardly and upwardly inclined position. An infant car bed of this type is disclosed in patent specification U.S. Pat. No. 3833946.

BRIEF SUMMARY OF THE INVENTION

According to the invention, an infant car bed of the type described above has a U-shaped handle with the ends of its limbs pivotally attached to the end portions of the cot body for angular movement about an axis extending longitudinally above said centre of gravity, between a position in which said limbs are perpendicular to said bottom portion and a position in which the handle is located to one side of said opening, said guide means comprising guide formations on said handle.

BRIEF DESCRIPTION OF THE DRAWINGS

FIG. 10 is a scrap elevational view showing part of the end of the cot illustrated in FIG. 9 on an enlarged scale;

FIG. 11 is a scrap plan view corresponding to FIG. 10;

FIG. 12 is a cross-sectional view taken on the line 12—12 in FIG. 10; and

FIG. 13 is a cross-sectional view, similar to FIG. 12, but showing part of the mechanism in an alternative position.

DETAILED DESCRIPTION

Figure 1:
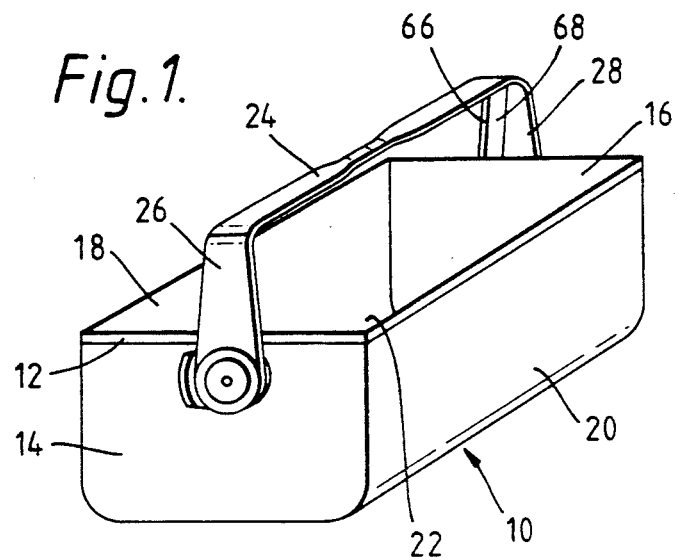
FIG. 1 is a perspective view of an infant car bed in accordance with a first embodiment of the invention with the handle in its first position.

FIG. 1 shows a car bed in accordance with the invention for use by an infant up to the age of three months. It consists of a cot body 10 having a rigid rim 12. The rim supports end portions 14 and 16, and side portions 18 and 20. A bottom portion 22 is secured to the bottom edges of the end and side portions 14 to 20. A U-shaped handle 24 has a central horizontal portion extending parallel to the sides of the cot 18 and 20, and two end limbs 26 and 28 which are pivotally attached to the outer faces of the end portions 14 and 16 of the body 10.

Figure 3:
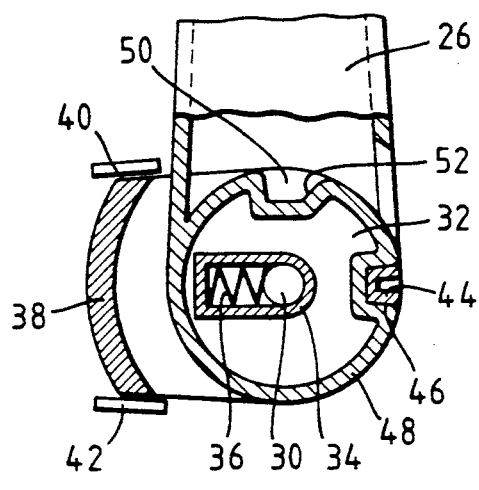
FIG. 3 is a cross-sectional view of the pivotal attachment at one end of the handle, taken in a plane perpendicular to the pivot axis and with the handle in its first position.
Figure 4:
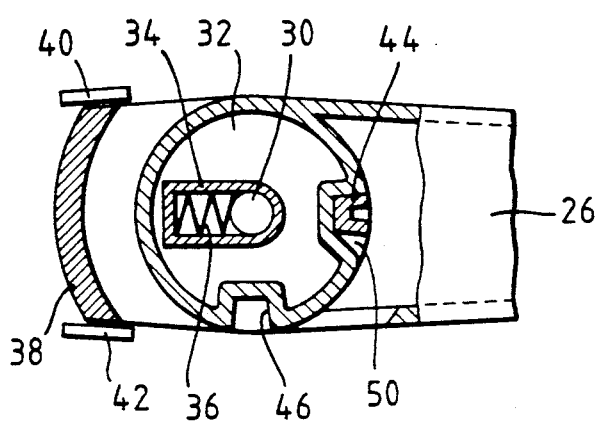
FIG. 4 is a cross-sectional view, similar to FIG. 3 but with the handle in its second position.

As can be seen from FIGS. 3 and 4, the pivot joint coupling the end limb 26 to the end portion 14 includes a pivot pin 30 which is rigidly secured to the end portion 14. A locking member or slider 32 has an elongate slot bounded by a wall portion 34. The pivot pin 30 projects through this slot and is biassed towards the right-hand thereof, as viewed in FIGS. 3 and 4, by a compression spring 36. The slider 32 has a push pad 38 on its left-hand end which is received between guide projections 40 and 42 formed on the end portion 14 of the body 10. The guide projections 40 and 42 block angular movement of the slider 32 about the pivot pin 30.

The slider 32 also has a detent formation 44 on the opposite side of the pivot pin 30 to the push pad 38. When the handle 24 is in the position shown in FIGS. 1 and 3, the detent formation 44 engages in a recess 46 formed in a cylindrical flange 48 on the limb 26 (surrounding the pivot pin 30), thereby locking the handle 24 in position. When it is desired to move the handle 24 to the position shown in FIGS. 2 and 4, the push pad 38 is depressed against the action of the spring 36, so as to disengage the detent 44 from the recess 46. The handle 24 is then free to pivot about the pin 30 until the detent formation 44 is in alignment with a second recess 50 in the flange 48, the handle 24 then being in the position illustrated in FIGS. 2 and 4. The second recess 50 has one of its side faces 52 inclined so as to serve as a cam formation, enabling the detent 44 to be displaced outwardly if sufficient force is applied to the handle 24 in a direction to move it back to its position illustrated in FIG. 1 without the need to depress the push pad.

Figure 2:
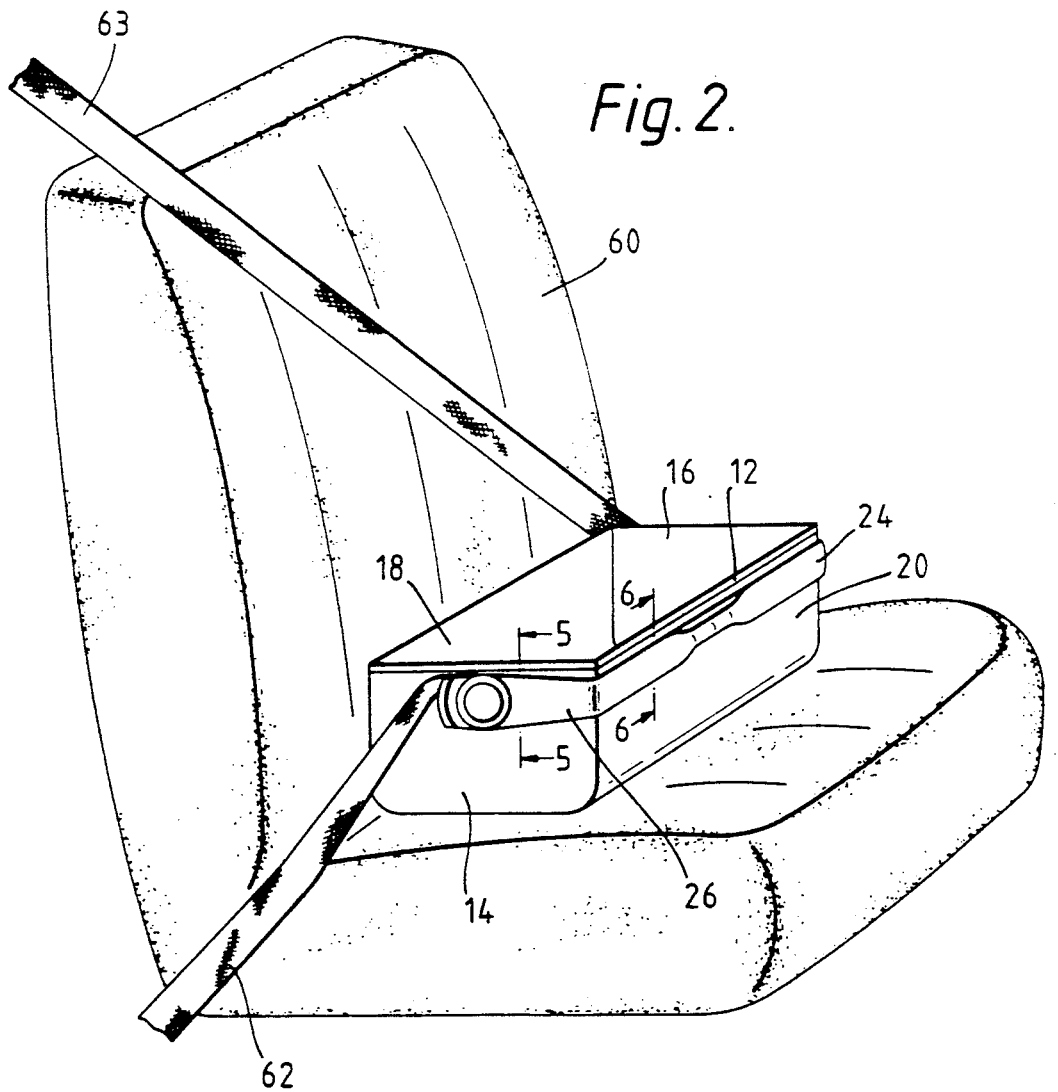
FIG. 2 is a perspective view, showing the cot illustrated in FIG. 1 positioned on a car seat and with the handle in its second position.
Figure 5:
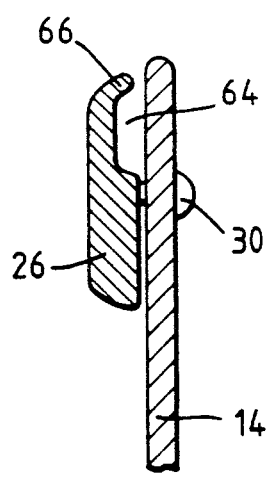
FIG. 5 is a cross-sectional view taken on the line 5—5 in FIG. 2.
Figure 6:
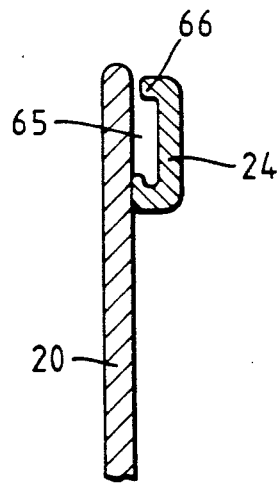
FIG. 6 is a cross-sectional view taken on the line 6—6 in FIG. 2.
Figure 7:
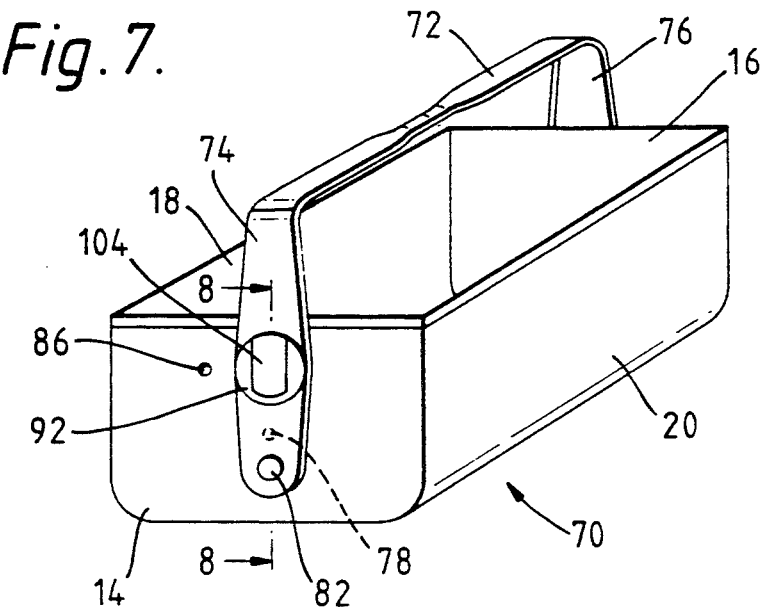
FIG. 7 is a perspective view, similar to FIG. 1, of a second embodiment of the invention.

Reverting to FIG. 2, the cot body 10 is secured in position on a vehicle seat 60 by the lap portion 62 of an adult seat belt which also has a shoulder portion 63. As can be seen from FIG. 5, the end limb 26 of the handle 24 has a recess 64 in its upper half, running from its end to its junction with the central portion of the handle 24, where it communicates with a similar recess 65 occupying most of the width of the central part of the handle. A lip 66 runs along the entire upper edge of the handle (when illustrated in the position illustrated in FIG. 2). In use, the lap belt 62 runs along the recesses 64 and 65 and a similar recess 68 (FIG. 1) in the other end limb 28. As can be seen from FIG. 2, the spacing between the two anchorages for the lap belt 62 is greater than the length of the cot body lo and consequently the ends of the lap belt 62 splay outwardly and keep the belt 62 engaged under the lip 66. In the event of sudden deceleration of the vehicle, the cot body 10 pivots about the axis of the pin 30 (and the corresponding pin in the other end 16 of the cot body) as described in the above mentioned U.S. patent specification.

FIGS. 7 to 13 illustrate another embodiment of the invention. The cot body 70 is basically similar to the cot body 10 of FIGS. 1 to 6 and corresponding parts are denoted by the same reference numerals. However, the handle 24 is replaced by a handle 72 having end limbs 74 and 76, the limb 74 projecting well beyond the point at which it is pivotally attached to the end portion 14 and the limb 76 projecting well beyond the corresponding pivot point on the other end portion 16 of the cot body.

Figure 8:
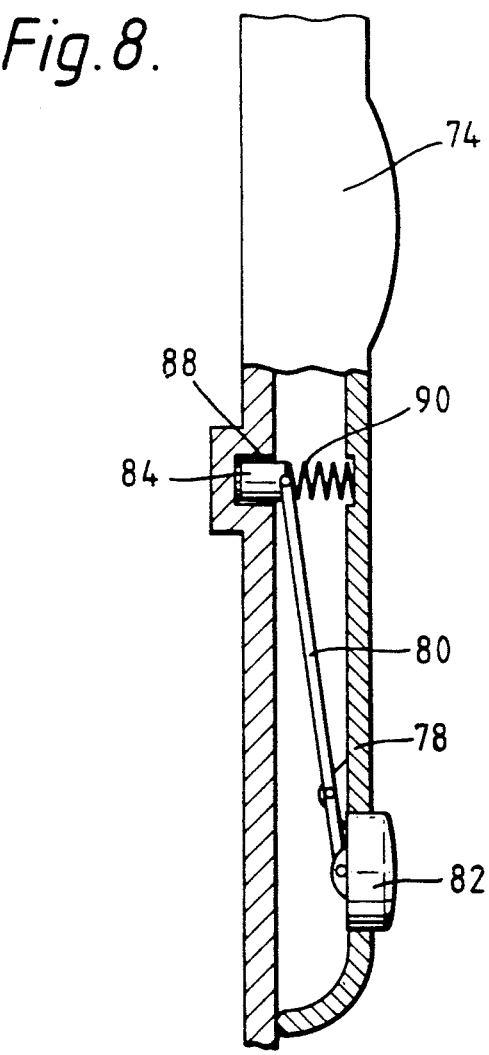
FIG. 8 is a cross-sectional view taken on the line 8—8 in FIG. 7.

The end portion 78 of the limb 74 includes a hollow portion in which a lever 80 is pivotally mounted. One end of the lever 80 carries a push pad 82 and the other end carries a bolt 84 which engages in a hole 86 (FIG. 7) in the end portion 14 of the cot body when the handle is in its horizontal position, and in a hole 88 (FIGS. 8 and 9) when the handle is in its vertical position. Depression of the push pad 82 causes disengagement of the bolt 84 against the action of a compression spring 90 (FIG. 8). A similar locking mechanism is provided on the limb 76 at the other end of the cot body, these mechanisms replacing the locking mechanism illustrated in FIGS. 3 and 4.

FIGS. 10 to 13 illustrate the pivotal connection between the end limb 74 of the handle 72 and the end portion 14 of the cot body 70 in more detail. A generally cylindrical mounting bracket 92 has an integral boss 94, with a cylindrical outer surface on which the end limb 74 of the handle 72 is journalled. The boss 94 projects through a hole in the end portion 14 of the cot body 70. A peg 96, of non-circular cross-section, engages in a correspondingly shaped hole in the boss 94 so as to hold the bracket 92 fast with the cot body 70.

Figure 9:
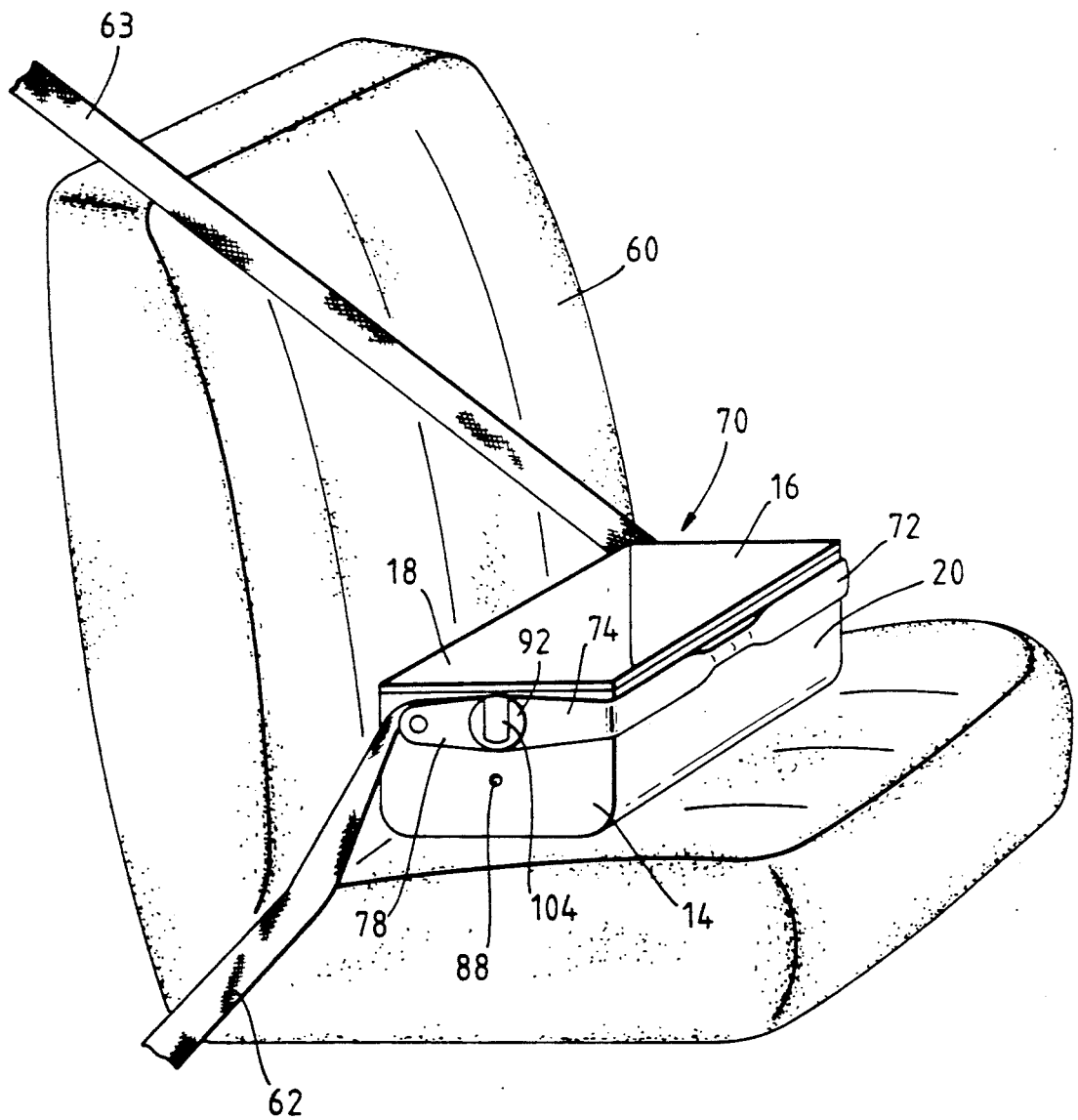
FIG. 9 is a perspective view, similar to FIG. 2, of the embodiment of the invention shown in FIG. 7.

As can be seen from FIG. 10, the mounting bracket 92, which is of generally cylindrical shape, has a rectangular recess 98 in its end face, extending downwardly from its upper edge and terminating a short distance above its lower edge. Intersecting the recess 98 is a V-shaped groove 100, aligned with a recess 102 in the end portion 74 of the handle 72 (equivalent to the recess 64 of FIG. 5). When the cot 70 is positioned on the vehicle seat, as shown in FIG. 9, the lap portion 62 of the seat belt is received in the groove 100 (as shown in FIG. 12) and in the recess 102.

In order to retain the belt 62 in the groove 100, an L-shaped tilting catch 104 is pivotally mounted on a horizontal pin 106 which extends across the recess 98. When the handle 72 is its horizontal position, as shown in FIG. 9, the catch 104 can pivot to the position shown in FIG. 12, in which an upper limb 108 covers the top of the groove 100 so as to retain the belt 62 therein. The catch 104 can be pivoted to the position shown in FIG. 13 to allow the belt 62 to be removed. When the handle 72 is above the horizontal position illustrated in FIG. 9, and in particular, when it is in the vertical position shown in FIG. 7, the end limb 74 obstructs movement of the catch 104 into the position shown in FIG. 12.

We claim:

1. A car bed for an infant comprising a cot body having a generally rigid rim providing support for opposed end portions, side portions and a bottom portion of the cot body, at least the end portions being rigidly constructed and attached to the rim; belt guide means located on the cot body above the centre of gravity of the car bed as a whole so that, in use, the cot body will rotate as a unit upon sudden deceleration, so that the bottom portion of the cot body is displaced forwardly in an arcuate path to a forwardly and upwardly inclined position, characterised by a single U-shaped handle with the ends of its limbs pivotally attached to both end portions of the cot body for angular movement about an axis extending longitudinally above said centre of gravity, between a position in which said limbs are perpendicular to said bottom portion and a position in which the handle is located to one side of said opening, said guide means comprising guide formations on said handle.

2. A car bed according to claim 1, further comprising latch means for securing the handle in each of said two positions.

3. A car bed for an infant comprising a cot body having a generally rigid rim providing support for end portions, side portions and a bottom portion of the cot body, at least the end portions being rigidly constructed and attached to the rim; belt guide means located on the cot body above the centre of gravity of the car bed as a whole so that, in use, the cot body will rotate as a unit upon sudden deceleration, so that the bottom portion of the cot body is displaced forwardly in an arcuate path to a forwardly and upwardly inclined position, characterized by a U-shaped handle with the ends of its limbs pivotally attached to the end portions of the cot body for angular movement about an axis extending longitudinally above said centre of gravity, between a position in which said limbs are perpendicular to said bottom portion and a position in which the handle is located to one side of said opening, and said guide means comprising an elongate recess in the surface of the handle facing the cot body.

4. A car bed according to claim 3, further comprising latch means for securing the handle in each of said two position.

5. A car bed according to claim 4, wherein the latch means comprises a pair of holes in one of the end portions of the cot body located at equal distances from the pivot axis, and a springbiased detent mounted on one of the limbs of the U-shaped handle for movement in a direction parallel with the pivot axis into and out of engagement with one or other of said holes.

6. A car bed according to claim 5, wherein the guide formations comprise an elongate recess in the surface of the handle facing the cot body.

7. A car bed according to claim 5, wherein the U-shaped handle is pivotally attached to a mounting bracket on one of the end portions of the cot body, and the guide formations comprise a groove in the mounting bracket and a tiltable catch for covering the open side of said groove.

8. A car bed according to claim 7, wherein the guide formations comprise an elongate recess in the surface of the handle facing the cot body.

9. A car bed according to claim 4, wherein the U-shaped handle is pivotally attached to a mounting bracket on one of the end portions of the cot body, and the guide formations comprise a groove in the mounting bracket and a tiltable catch for covering the open side of said groove.

10. A car bed according to claim 9, wherein the guide formations comprise an elongate recess in the surface of the handle facing the cot body.

11. A car bed according to claim 3, wherein the U-shaped handle is pivotally attached to a mounting bracket on one of the end portions of the cot body, and the guide formations comprise a groove in the mounting bracket and a tiltable catch for covering the open side of said groove.

12. A car bed according to claim 4, wherein the guide formations comprise an elongate recess in the surface of the handle facing the cot body.

13. A car bed according to claim 4, wherein the latch means comprises cam formations on an annular flange formed on the handle so as to be coaxial with the pivot axis, and a spring-biased detent mounted on one of the end portions of the cot body for movement in a direction perpendicular to the pivot axis into and out of engagement with said cam formations.

14. A car bed for an infant comprising a cot body having a generally rigid rim providing support for end portions, side portions and a bottom portion of the cot body, at least the end portions being rigidly constructed and attached to the rim; belt guide means located on the cot body above the centre of gravity of the car bed as a whole so that, in use, the cot body will rotate as a unit upon sudden deceleration, so that the bottom portion of the cot body is displaced forwardly in an arcuate path to a forwardly and upwardly inclined position, characterised by a U-shaped handle with the ends of its limbs pivotally attached to the end portions of the cot body for angular movement about an axis extending longitudinally above said centre of gravity, between a position in which said limbs are perpendicular to said bottom portion and a position in which the handle is located to one side of said opening, the U-shaped handle being pivotally attached to a mounting bracket on one of the end portions of the cot body, and the guide means comprising a groove in the mounting bracket and a tiltable catch for covering the open side of said groove.

* * * * *